United States Patent
Kamiyama et al.

[11] Patent Number: 6,152,184
[45] Date of Patent: Nov. 28, 2000

[54] BRANCH PIPE LINER BAG AND BRANCH PIPE LINING METHOD

[75] Inventors: Takao Kamiyama, Kanagawa-ken; Yasuhiro Yokoshima; Shigeru Endoh, both of Ibaraki-ken; Hiroyuki Aoki, Saitama-ken, all of Japan

[73] Assignees: Shonan Gosei-Jushi Seisakusho K.K., Hiratsuka; Yokoshima & Company, Ibaraki-ken; Get Inc., Tsukuba; OAR Company, Tokorozawa, all of Japan

[21] Appl. No.: 09/247,631

[22] Filed: Feb. 10, 1999

[30] Foreign Application Priority Data

Feb. 27, 1998 [JP] Japan .................. 10-048011

[51] Int. Cl.[7] ................................ F16L 55/16
[52] U.S. Cl. ............................. 138/98; 138/97
[58] Field of Search ......................... 138/97, 98

[56] References Cited

U.S. PATENT DOCUMENTS

| | | | |
|---|---|---|---|
| 3,968,552 | 7/1976 | Hunter | 138/98 |
| 5,329,063 | 7/1994 | Endoh | 138/98 |
| 5,439,033 | 8/1995 | Kamiyama et al. | 138/97 |
| 5,454,401 | 10/1995 | Kamiyama et al. | 138/97 |
| 5,498,389 | 3/1996 | Kamiyama et al. | 264/269 |
| 5,566,719 | 10/1996 | Kamiyama et al. | 138/97 |
| 5,700,100 | 12/1997 | Kamiyama et al. | 138/97 |
| 5,916,406 | 6/1999 | Kamiyama et al. | 138/97 |
| 5,944,058 | 8/1999 | Kamiyama et al. | 138/97 |
| 5,967,192 | 10/1999 | Lewin | 138/97 |
| 5,971,031 | 10/1999 | Kamiyama et al. | 138/97 |
| 6,006,787 | 12/1999 | Kamiyama et al. | 138/97 |

*Primary Examiner*—James Hook
*Attorney, Agent, or Firm*—Knobbe, Martens, Olson & Bear, LLP

[57] ABSTRACT

A branch pipe lining method is provided for maintaining a favorable surface state on the inner surface of a lined branch pipe. The branch pipe lining method utilizes a branch pipe liner bag composed of a tubular resin-absorbent material having a flange formed at one end thereof, wherein the outer surface of the tubular resin-absorbent material is covered with a highly air-tight film, and the tubular resin-absorbent material is impregnated with an unhardened hardenable resin, and a cylindrical fluid pressure sealing member attached to the inner surface of the flange. A cylindrical front end nozzle attached to an opening at one end of a pressure bag is inserting into the fluid pressure sealing member of the branch pipe liner bag, and the front end nozzle and the fluid pressure sealing member are sealed by an elastic member interposed therebetween. Then, a pressurized fluid is supplied into the pressure bag, with the flange of the branch pipe liner bag being in close contact with an opening of a branch pipe, to evert and insert the branch pipe liner bag into the branch pipe from a main pipe toward the ground. The hardenable resin impregnated in the branch pipe liner bag is hardened with the inserted branch pipe liner bag being pressed onto an inner wall of the branch pipe, followed by pulling the front end nozzle out from the fluid pressure sealing member to tear the pressure bag off the branch pipe liner bag.

22 Claims, 13 Drawing Sheets

BRANCH PIPE LINER BAG AND BRANCH PIPE LINING METHOD

BACKGROUND OF THE INVENTION

1. Field of the Invention

This invention relates to pipe lining techniques, and more particularly, to a branch pipe liner bag having a hardened flange at one end thereof for easy and reliable positioning, and a method of lining a branch pipe using the branch pipe liner bag.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized air such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner bag is pressed against the inner wall of the pipe by a pressurized air, and the tubular flexible liner is hardened as the hardenable resin impregnated in the liner is heated, which is effected by heating the air filling the tubular liner bag. It is thus possible to line the inner wall of the defective or old pipe with a rigid liner without digging the ground and disassembling the pipe sections.

Generally, a main pipe of sewerage pipe lines or the like may have a plurality of branch pipes confluent, thereto, which can also be lined by a method similar to that mentioned above. An example of applying the above-mentioned method to a branch pipe is illustrated in FIG. 17.

FIG. 17 is a cross-sectional view illustrating a conventional branch pipe lining method, wherein a pressure bag 113 for eversion is inserted into a main pipe 110. Since this pressure bag 113 must be eventually separated from a branch pipe liner bag 101, a sealed tube 130 must be connected to the pressure bag 113 for applying a pressure to the branch pipe liner bag 101.

The pressure bag 113 is supplied with compressed air or the like, and the sealed tube 130 and the branch pipe liner bag 101 are inserted inside out into a branch pipe 111. With the illustrated state maintained, a hardenable resin impregnated in the branch pipe liner bag 111 is hardened. Then, the sealed tube 130 is pulled out of the branch pipe 111 (branch pipe liner bag 101), the inner wall of the branch pipe 111 is lined with the hardened branch pipe liner bag 111, thus repairing the branch pipe 111.

In the method mentioned above, however, a sealed tube of an appropriate length must be prepared for a branch pipe of a different-length each time a different branch pipe is repaired, thus requiring a replacement of a sealed tube for each branch pipe.

To solve the inconvenience mentioned above, a branch pipe lining method illustrated in FIGS. 18 and 19 has been previously proposed by the present inventors.

FIGS. 18 and 19 are cross-sectional views illustrating that previously proposed branch pipe lining method. In this method, an air-tight connection between a pressure bag 213 and a branch pipe liner bag 201 is provided by a tear-off tube 230, one end of which is temporarily bonded to the branch pipe liner bag 201. In these drawings, a guide tube 231 is disposed in a main pipe 210, and an air mat 232 is used to urge a flange 203 of the branch pipe liner bag 201 onto the inner wall surface of the main pipe 210. Also, an in-pipe work robot 212 has been introduced in the main pipe 210.

Specifically, as illustrated in FIG. 18, when a pressure bag 213 is supplied with compressed air with the flange 203 of the branch pipe liner bag 201 maintained pressed onto the inner wall of the main pipe 210, the branch pipe liner bag 201 is everted and inserted into the branch pipe 211 in a direction indicated by a white arrow by the action of the compressed air which applies a pressure to the branch pipe 21. When the branch pipe liner bag 201 has been completely inserted into the branch pipe 211 over the entire length thereof, a hardenable resin impregnated in the branch pipe liner bag 201 is hardened to line the branch pipe 211 with the hardened branch pipe liner bag 201, thus repairing the branch pipe 211.

After the branch pipe is lined as mentioned above, the pressure bag 23 is moved in a direction indicated by a horizontal arrow as illustrated in FIG. 19. Since the pressure bag 213 and the robot 212 are linked together by the-guide tube 231, the robot 212 is also moved in the same direction. The tear-off tube 230 temporarily bonded to the branch pipe liner bag 201 is torn off the temporarily bonded portion, and separated from the branch pipe liner bag 201.

Therefore, according to the method mentioned above, since the air-tight connection between the pressure bag 213 and the branch pipe liner bag 201 is provided by the tear-off tube 230, the same tear-off tube 230 can be used even if a branch pipe of a different length is to be lined, thus eliminating the replacement of the sealed tube 130 in the method illustrated in FIG. 17.

However, when the tear-off tube 230 is torn off, the tear-off tube 230 may not be completely removed from the branch pipe linear bag 201 with a portion thereof remaining on the inner wall of the branch pipe liner bag 201. The remaining portion of the tear-off tube 230 acts as unwanted flash which causes problems such as a deteriorated inner wall surface of the branch pipe 211, attachment of flowing substances within the branch-pipe 211 to the flash, and so on.

OBJECT OF THIS INVENTION

This invention has been made in view of the problems mentioned above, and its principal object is to provide an improved branch pipe liner bag and also a branch pipe lining method.

It is a further object of this invention is to provide a branch pipe liner bag and a branch pipe lining method which are capable of maintaining a satisfactory condition of the inner surface of a lined branch pipe.

SUMMARY OF THE INVENTION

This invention is adapted to be embodied in a branch pipe liner bag. The branch pipe liner bag comprises a tubular resin-absorbent material having a flange formed at one end thereof, the outer surface of the tubular resin-absorbent material being covered with a fluid-tight film, the tubular resin-absorbent material being impregnated with an unhardened hardenable resin, and a cylindrical member attached to the inner surface of the tubular resin-absorbent material and having a sealing surface which is capable of receiving an urging force to seal a fluid pressure.

This invention is also adapted to be embodied in a branch pipe lining method. The branch pipe lining method uses a branch pipe liner bag comprised of a tubular resin-absorbent material having a flange formed at one end thereof, the outer surface of the tubular resin-absorbent material being covered with a fluid-tight film, the tubular resin-absorbent material being impregnated with an unhardened hardenable resin. A cylindrical member is attached to the inner surface of the tubular resin-absorbent material and has a sealing surface which is capable of receiving an urging force to seal a fluid pressure, The method comprised the steps of (1) inserting a cylindrical front end nozzle attached to an opening at one end of a pressure bag into the cylindrical member of the branch pipe liner bag, the pressure bag accommodating the tubular resin absorbent material of the branch pipe liner bag except for the flange, (2) sealing the front end nozzle and the cylindrical member by an elastic member interposed therebetween, (3) bringing the flange of the branch pipe liner bag into close contact with an opening of a branch pipe, (4) supplying a pressurized fluid into the pressure bag to evert and insert the branch pipe liner bag into the branch pipe from a main pipe toward the ground, (5) hardening the hardenable resin impregnated in the branch pipe liner bag with the inserted branch pipe liner bag being pressed onto an inner wall of the branch pipe and (6) separating the front end nozzle from the cylindrical member to remove the pressure bag from the branch pipe liner bag.

Thus, according to the branch pipe liner bag and the method using the liner bag, a fluid-tight or air-tight connection between the pressure bag and the branch pipe liner bag is made by the elastic member interposed between the front end nozzle and the fluid pressure sealing member. After a branch pipe has been lined, the front nozzle is separated from the cylindrical member to remove the pressure bag from the branch pipe liner bag. As the result, a tear-off tube is no longer required and the branch pipe liner bag is only left in the branch pipe to maintain a favorable surface state of the lined branch pipe.

The above and other objects, features, and advantages of this invention will become apparent from the following detailed description of the preferred embodiments thereof when read in conjunction with the accompanying drawings.

DESCRIPTION OF THE PREFERRED EMBODIMENTS

This invention will hereinafter be described in connection with preferred embodiments thereof with reference to the accompanying drawings.

Figure 1:
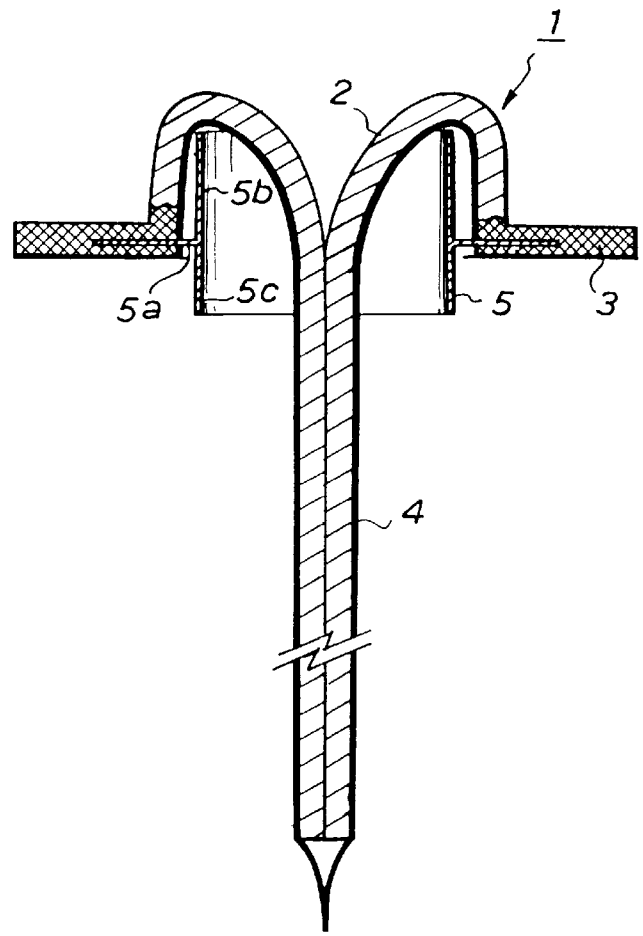
FIG. 1 is a cross-sectional view illustrating a branch pipe liner bag according to one embodiment of this invention.
Figure 2:
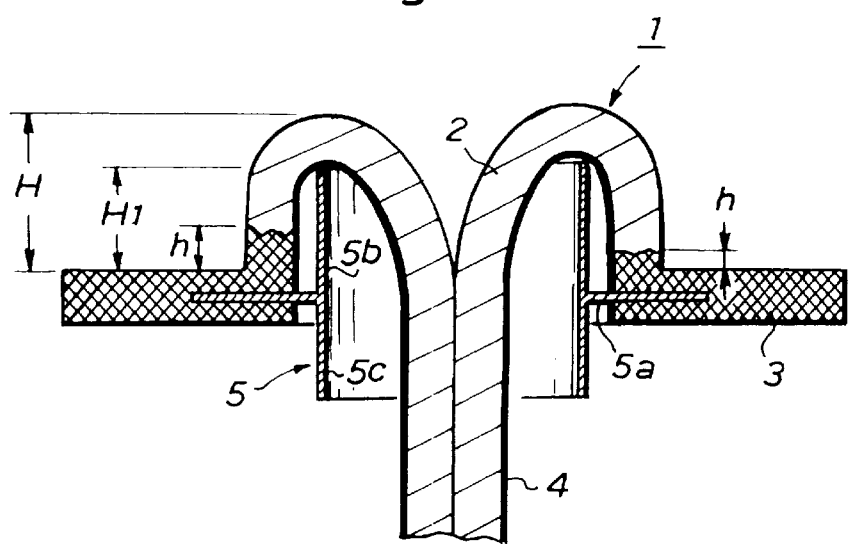
FIG. 2 is an enlarged cross-sectional view illustrating a flange portion of the branch pipe liner bag according to the embodiment of this invention.

FIG. 1 is a cross-sectional view illustrating a branch pipe liner bag 1 according to an embodiment of this invention. FIG. 2 is an enlarged cross-sectional view illustrating a flange of the branch pipe liner bag illustrated in FIG. 1.

The branch pipe liner bag 1 illustrated in FIG. 1 includes a tubular resin-absorbent material 2 impregnated with an unhardened hardenable resin, one end of which is folded out to form a hardened flange 3 integrally with the folded portion. The tubular resin absorbent material 2 has its outer surface coated with a highly airtight plastic film 4. It should be noted that the flange 3 maintains an arcuate form conformal with the shape of the inner wall of a main pipe 10 (see FIG. 8) by previously hardening a hardenable resin impregnated therein. A material for the unwoven fabric constituting the tubular resin absorbent material 2 may be selected from polyester, polypropylene, nylon, acrylic fabric, vinylon or the like. The hardenable resin impregnated in the tubular resin absorbent material 2 may be unsaturated polyester resin, epoxy resin, vinyl ester resin, or the like. A material for the plastic film 4 may be selected from polyethylene, vinyl chloride, vinylon, polyurethane, nylon, polypropylene, copolymers of polyethylene and nylon, and so on.

A cylindrical air pressure sealing member 5 is attached to the inner surface of the branch pipe liner bag 1 adjacent to the flange 3. The cylindrical member 5 is integrally molded by an injection method using metal or hard plastic. A ring-shaped flange 5a is formed around the outer periphery of the fluid pressure sealing member 5 at an intermediate height position. A protrusion 5b extending upwardly from the flange 5a protrudes into a branch pipe 11 (see FIG. 8) after the completion of a branch pipe lining operation, while a protrusion 5c extending downwardly from the flange 5a protrudes into the main pipe 10 after the completion of the branch pipe lining operation. The cylindrical member 5 has its flange 5a sandwiched by the flange 3 of the branch pipe liner bag 1 as illustrated to be attached to an inner wall portion adjacent to the flange 3 as mentioned above. The inner surface of the cylindrical member 5 constitutes a sealing wall surface which receives an urging force from an elastic body 17 (see FIG. 8) to seal a fluid pressure.

As illustrated in greater detail in FIG. 2, the hardened hardenable resin impregnated in the flange of the branch pipe liner bag 1 forms a hardened portion of a height h at a position adjacent to the flange 3 of the tubular resin absorbent material 2. The height h of this hardened portion, however, varies in the circumferential direction and is not constant. For this reason, the tubular resin absorbent material of the conventional branch pipe liner bag is generally bent at a different height (corresponding to a height H in FIG. 2) whenever a branch pipe is lined with such a branch pipe liner bag.

For more accurately positioning the flange of the branch pipe liner bag at an opening to a branch pipe in a branch pipe lining operation, the height H of the bent portion of the branch pipe liner bag (tubular resin absorbent material) is preferably larger. However, an excessively large height would cause a problem in that the bent portion of the branch pipe liner bag, introduced into the main pipe by a remotely controlled robot might come in contact with the inner wall of the branch-pipe, resulting in damaging the branch pipe liner bag.

The height H of the bent portion of the branch pipe liner bag therefore should be set at a maximum value within a range in which the bent portion of the branch pipe liner bag does not come in contact with the inner wall of the main pipe during the transportation of the branch pipe liner bag into the main pipe. Such setting, however, is virtually impossible due reason set forth above.

In the branch pipe liner bag 1 according to this invention, on the other hand, since the cylindrical air pressure sealing member 5 is attached to the inner surface of the flange 3, the tubular resin absorbent material 2 abuts to the upper end of the protrusion 5b of the cylindrical member 5, extending upwardly from the upper surface of the flange 3 by a height $H_1$ ($h<H_1<H$). The tubular resin absorbent material 2 is bent by the protrusion 5b of the fluid pressure sealing member 5 at a height H which is always constant irrespective of the height h of the hardened portion, so that the bending height H can be maintained at an optimal value (a maximum value available without causing a contact with the inner wall of the main pipe 10).

Next, branch pipe liner bags according to other embodiments will be described with reference to FIGS. 3–7.

Figure 3:
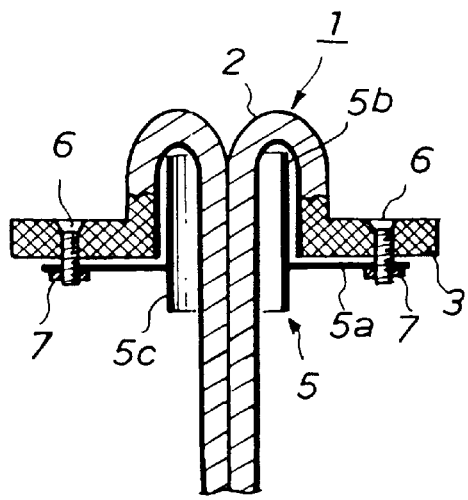
FIGS. 3–7 are cross-sectional views each illustrating a branch pipes liner bag according to various alternative embodiments of this invention.

A branch pipe liner bag 1 illustrated in FIG. 3 includes a cylindrical air pressure sealing member 5 secured to a flange 3 with a plurality of bolts 6 and nuts 7. More specifically, a flange 5a of the cylindrical member 5 is pressed onto the lower surface of the flange 3, and the cylindrical member 5 is secured to the flange 3 with a plurality of the bolts 6 extending through the flange 5a and the flange 3 and the same plurality of the nuts 7 engaged with the respective bolts 6. The cylindrical member 5 of this embodiment also has 5b, 5c extending upwardly and downwardly, respectively.

Figure 4:
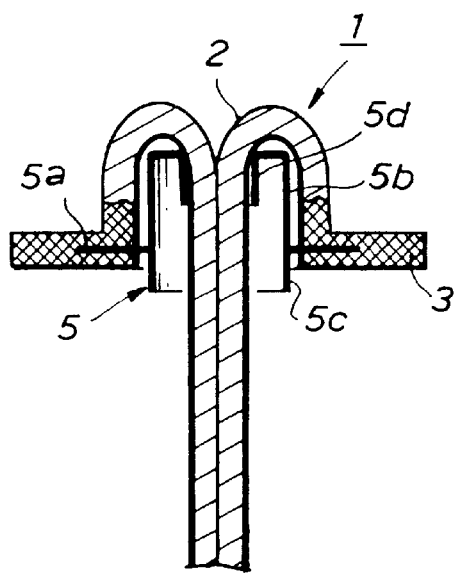

A branch pipe liner bag 1 illustrated in FIG. 4 has a fluid pressure sealing member 5 attached thereto in a similar manner to that illustrated in FIG. 1. Additionally, the cylindrical member 5 has its upper end portion bent inwardly to form a bent end portion 5d which defines a space or a pocket formed in a inverted C shape in cross-section. The fluid pressure sealing member 5 of this embodiment also has protrusions 5b, 5c extending upwardly and downwardly, respectively.

Figure 5:
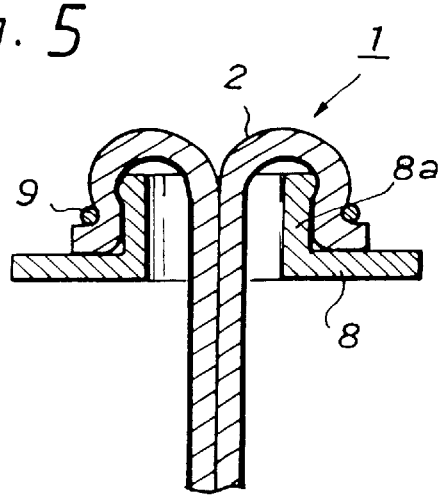
Figure 6:
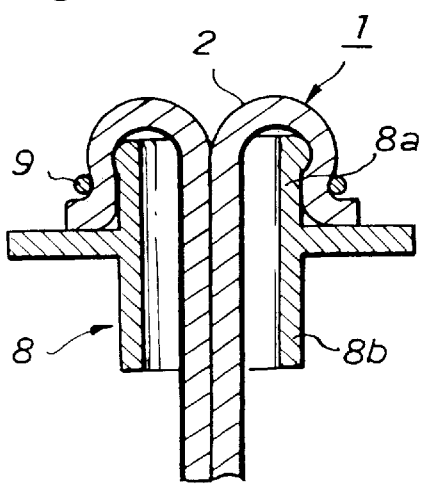
Figure 7:
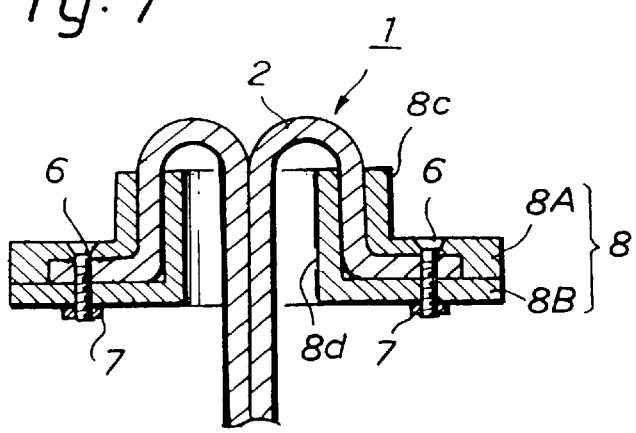

Branch pipe liner bags 1 illustrated in FIGS. 5–7 each have another flange 8, separate from a branch pipe liner bag 2, attached to one end of the branch pipe liner bag 2. In these branch pipe liner bags 1, the flange 8 also serves as a fluid pressure sealing member. The flange 8 is integrally molded by an injection method using metal or hard plastic.

More specifically, in the branch pipe liner bag 1 illustrated in FIG. 5, one end of the tubular resin absorbent material 2 is folded out, fit into a cylindrical protrusion 8a of the flange 8 (a portion protruding into a branch pipe 11 after a branch pipe lining operation is completed), and fixedly fastened by a band 9. This flange 8 does not have a protrusion protruding into a main pipe 10 after the branch pipe lining operation is completed.

The branch pipe liner bag 1 illustrated in FIG. 6 also has a flange 8 attached to one end portion of a tubular resin absorbent material 2, which is folded out, in a manner similar to the branch pipe liner bag 1 illustrated in FIG. 5. This branch pipe liner bag 1 differs from that illustrated in FIG. 5 in that the flange 8 has both of a protrusion 8a protruding into a branch pipe 11 and a protrusion 8b protruding into a main pipe 10 after a branch pipe lining operation is completed.

The branch pipe liner bag illustrated in FIG. 7 has a flange 8 composed of upper and lower separate pieces 8A, 8B. One end of a tubular resin absorbent material 2, which is folded out, is extended outwardly, and the extended portion is sandwiched by the upper and lower separate pieces 8A, 8B. Then, the upper and lower separate pieces 8A, 8B of the flange 8 and the extended end portion of the tubular resin absorbent material 2 are integrally fastened by a plurality of bolts 6 extending therethrough and the same plurality of nuts 7 engaged with the respective bolts 6. The upper and lower separate pieces 8A, 8B of the flange 8 are formed with cylindrical protrusions 8c, 8d, respectively, which protrude into a branch pipe 11 after a branch pipe lining operation is completed.

Next, a branch pipe lining method according to this invention performed using the branch pipe liner bag 1 illustrated in FIG. 1 will be described with reference to FIGS. 8–11. FIGS. 8–11 are cross-sectional views illustrating in at various steps of the branch pipe lining method of this invention.

As illustrated, a main pipe 10 of a sewage pipe line or the like has a branch pipe 11, having a smaller diameter, confluent thereto. Within the main pipe 10, an in-pipe work robot 12, a pressure bag 13 for eversion, the branch pipe liner bag 1 and so on have been introduced for operations associated with the branch pipe lining method.

The robot 12 is hydraulically driven. A hydraulic cylinder 14 is attached to a head portion 12a of the robot 12, and a setting arm 15 is attached to a vertically sliceable rod 14a (see FIG. 9) of the hydraulic cylinder 14. A cylindrical front end nozzle 16 extends through and is supported by the setting arm 15. A ring-shaped elastic member 17 is fitted on the top outer periphery of the front end nozzle 16, while an opening at one end of the pressure bag 13 is attached to the outer periphery of the lower end of the front end nozzle 16. A hydraulic hose 18 and a pull rope 19 are attached to the robot 12, and a TV camera 20 for monitoring is installed on the top of the robot 12. The hydraulic hose 18 is connected to a hydraulic pump, not shown, installed on the ground, while the TV camera 20 is connected to a monitor, not shown, similarly installed on the ground, through an electric cable 21.

The pressure bag 13 has the other end (closed end) connected with an air hose 22 and a pull rope 23. The air hose 22 is connected to a compressor, not shown, installed on the ground.

Figure 8:
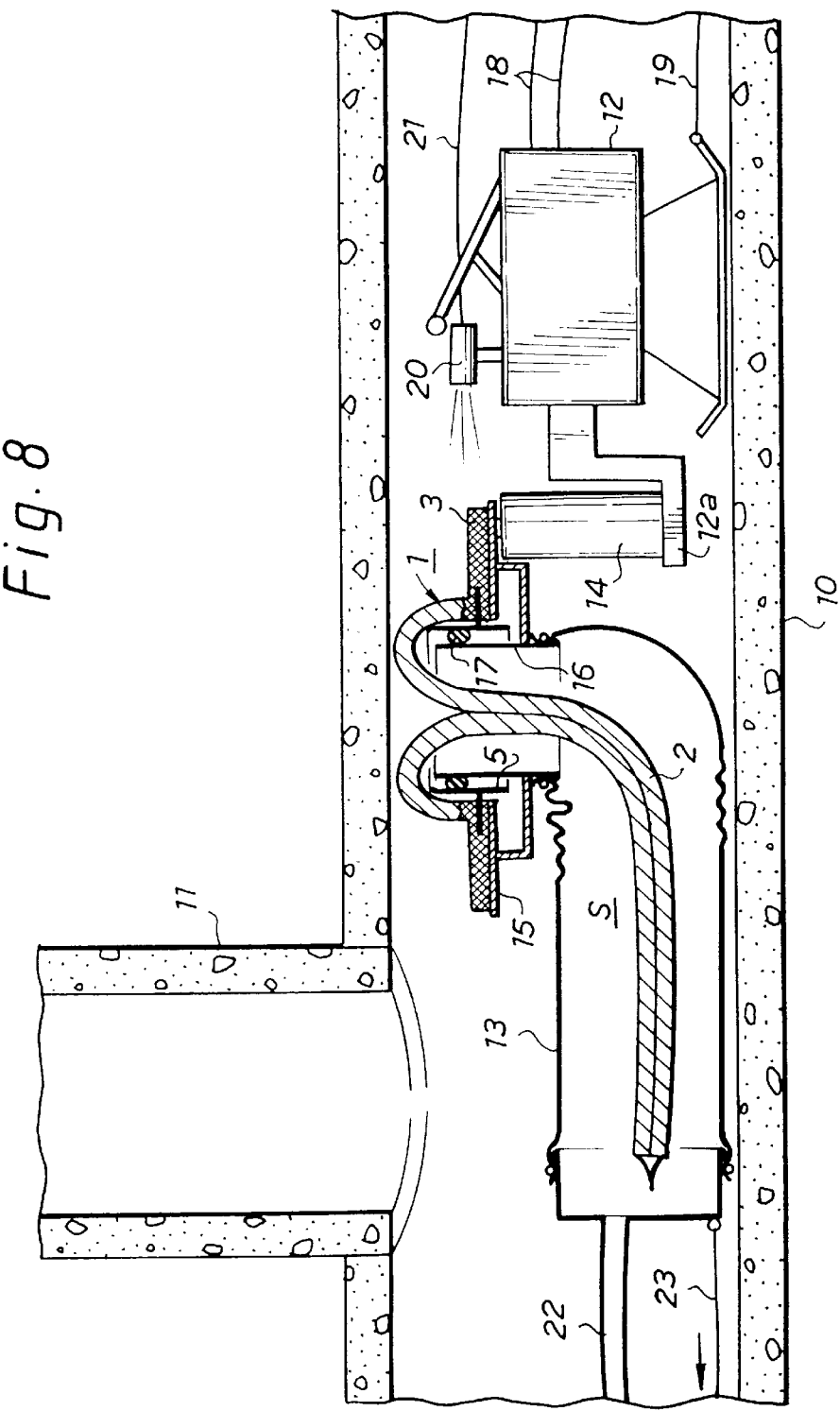
FIGS. 8–11 are cross-sectional views illustrating in order various steps of a branch pipe lining method according to this invention.
Figure 9:
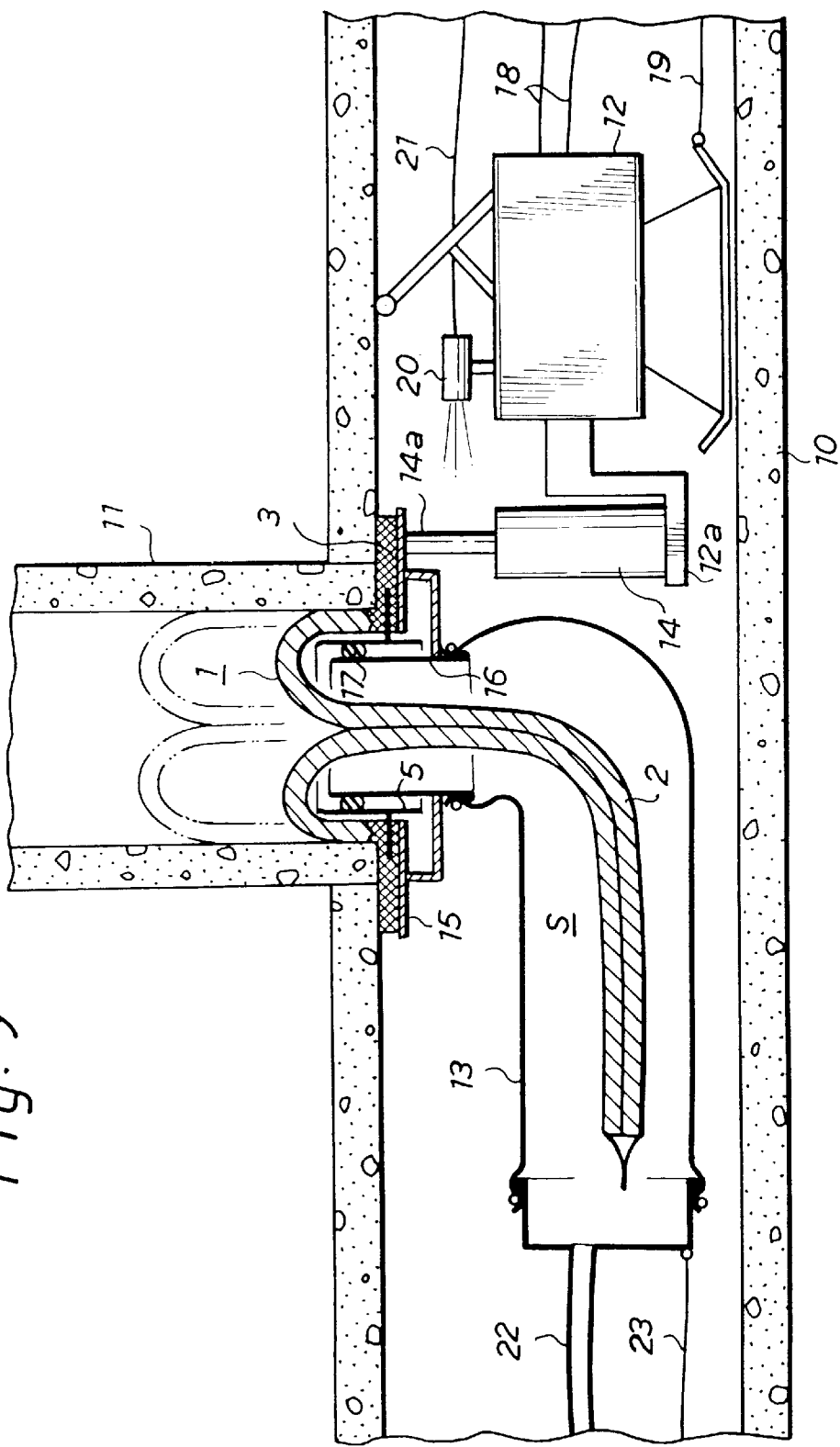

As illustrated in FIGS. 8 and 9, the branch pipe liner bag 1 has its flange 3 set on the setting arm 15, and the uneverted tubular resin absorbent material 2 except for the flange 3 is accommodated in the pressure bag 13. The front end nozzle 16 is inserted into the cylindrical member 5 of the branch pipe liner bag 1 from below, wherein the elastic member 17 fitted on the top outer periphery of the front end nozzle 11 is pressed onto the inner wall of the cylindrical member 5 to provide air-tight sealing between the front end nozzle 16 and the cylindrical member 5. The inner surface of the cylindrical member 5 constitutes a sealed wall surface which receives an urging force of the elastic member 17 to seal the air pressure.

With the configuration described above, the pull rope 23 is pulled, for example, to the left (indicated by an arrow) as illustrated in FIG. 8 to move the integrally assembled robot 12, pressure bag 13, branch pipe liner bag 1 and so on in the same direction inside the main pipe 10. In this event, since the bending height H (see FIG. 2) of the branch pipe liner bag 1 is maintained at an optimal value (a maximum value available without causing a contact with the inner wall of the main pipe 10) as mentioned above, the branch pipe liner bag never come into contact with the main pipe 1 to get damaged thereby.

Then, the flange 3 of the branch pipe liner bag 1 is positioned at an opening of the branch pipe as illustrated in FIG. 9, while monitoring the operation on the ground through the TV camera 20 installed on the robot 12. Subsequently, the rod 14a of the hydraulic cylinder 14 is elevated to bring the flange 3 of the branch pipe liner bag 1 into close contact with the periphery of the opening of the branch pipe 11. Since the branch pipe liner bag 1 has the bending height H (see FIG. 2) fixed at the optimal value (a maximum value available without causing a contact with the inner wall of the main pipe 10) as mentioned above, the flange 3 can be readily and reliably positioned.

In a state illustrated in FIG. 9, a closed space S defined by the branch pipe liner bag 1 is formed within the pressure bag 13. Since the front end nozzle 16 and the cylindrical member 5 are air-tight sealed by the elastic member 17, a high sealability is ensured for the closed space S.

In the state described above, a compressor, not shown, installed on the ground is driven to supply compressed air into the closed space S within the pressure bag 13 from the air hose 22, causing the tubular resin absorbent material 2 of the branch pipe liner bag 1 to be everted and inserted into the branch pipe 11 from the main pipe side, as indicated by broken lines in FIG. 9, by the pressure of the compressed air applied to tubular resin absorbent material 2.

Figure 10:
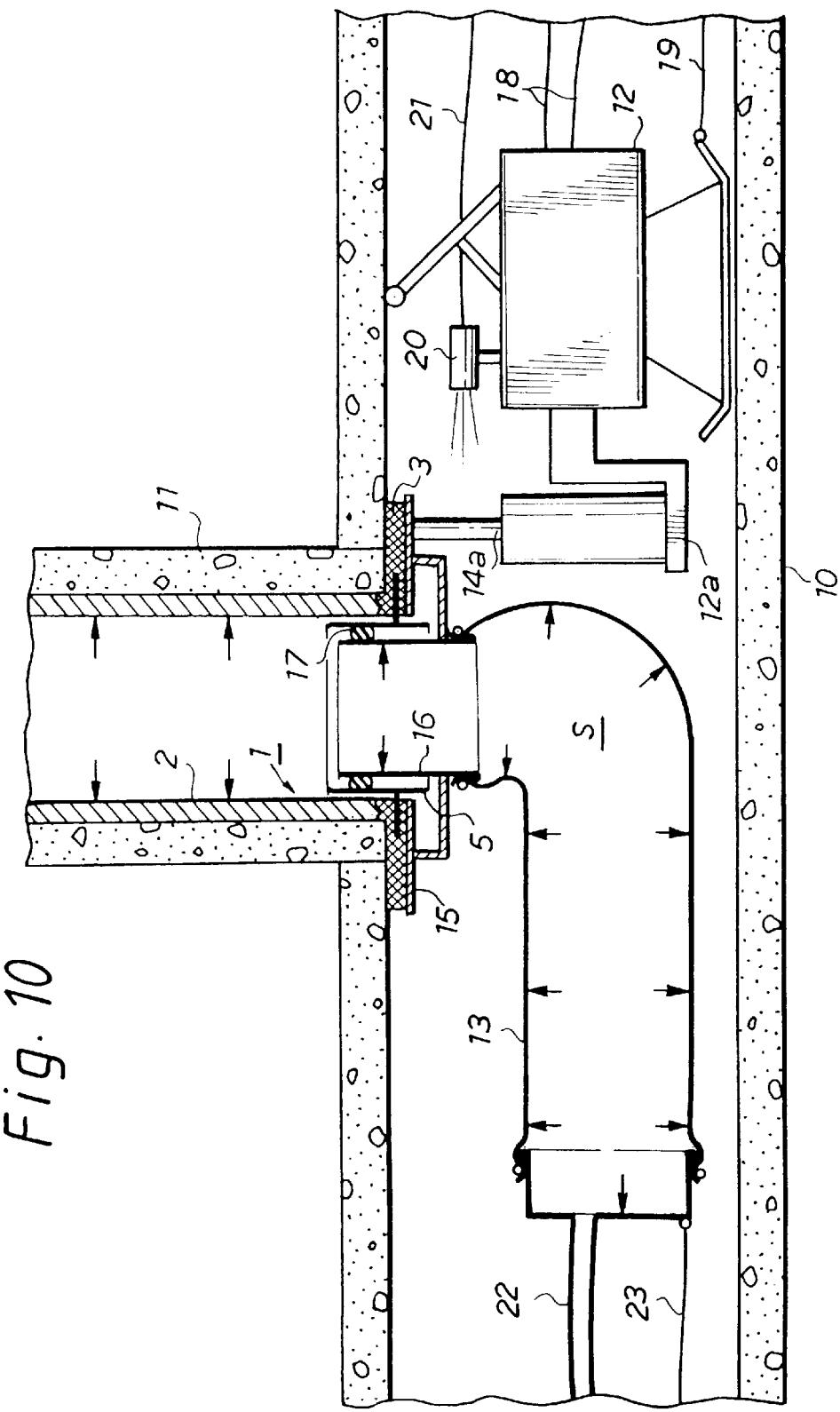
Figure 11:
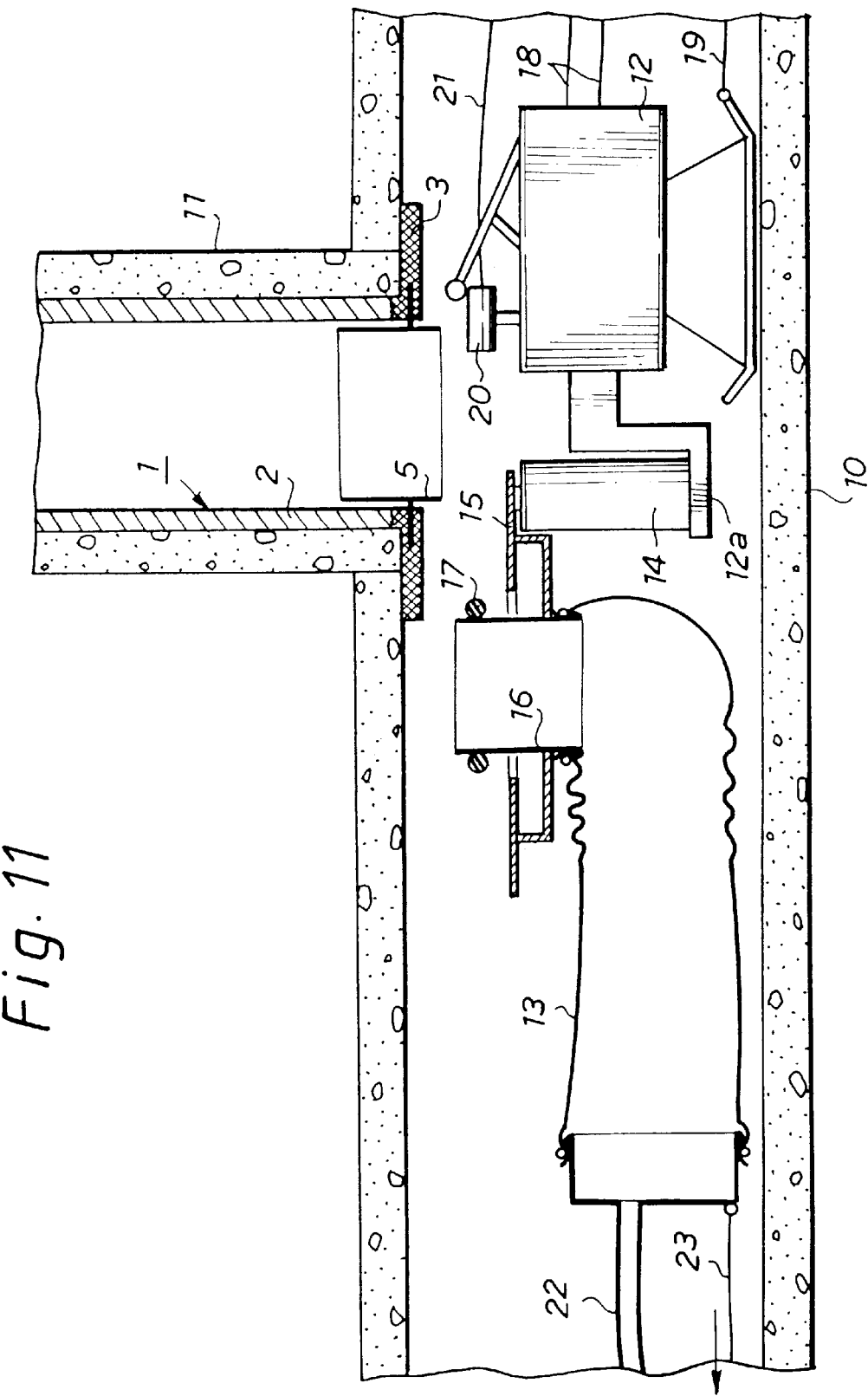

Then, as illustrated in FIG. 10, when tubular resin absorbent material 2 of the branch pipe liner bag 1 has been everted and inserted into the branch pipe 11 over the entire length thereof, the hardenable resin impregnated in the tubular resin absorbent material 2 is hardened by an appropriate method, with the tubular resin absorbent material 2 remaining pressed onto the inner wall surface of the branch pipe 11. In this way, the branch pipe 11 has its inner wall surface lined with the hardened branch pipe liner bag 1, thus repairing and reinforcing the inner wall surface of the branch pipe 11.

After the branch pipe 11 has been lined as described above, the rod 14a of the hydraulic cylinder 14 is lowered and the front end nozzle 16 is pulled out from the fluid-pressure sealing member 5 of the branch pipe liner bag 1. This results in separation of the front end nozzle 16 and the pressure bag 13, attached thereto, from the branch pipe liner bag 1, so that the pull rope 23 is pulled to the left (indicated by an arrow) in FIG. 11 to move the pressure bag 13, the robot 12, and so on in the same direction. Consequently, the branch pipe liner bag 1 is only left in the branch pipe 11, thus completing a sequence of lining operations for the branch pipe 11.

According to the branch pipe lining method of the embodiment using the branch pipe liner bag 1, an air-tight connection between the pressure bag 13 and the branch pipe liner bag 1 is made by the elastic member 17 interposed between the front end nozzle 16 and the fluid pressure sealing member 5. After a branch pipe has been lined, the front nozzle 16 is pulled out from the cylindrical member S to separate the pressure bag 13 from the branch pipe liner bag 1. As the result, a tear-off tube (separable tube), which has been conventionally required for the branch pipe lining method is no longer needed. Thus, the branch pipe liner bag 1 is only left in the branch pipe to maintain a favorable surface state of the lined branch pipe 11.

Now, sealing states of the branch pipe liner bags previously illustrated in FIGS. 3–7 during a branch pipe lining operation are illustrated in partial cross-sectional views of FIGS. 12–16, respectively.

Figure 12:
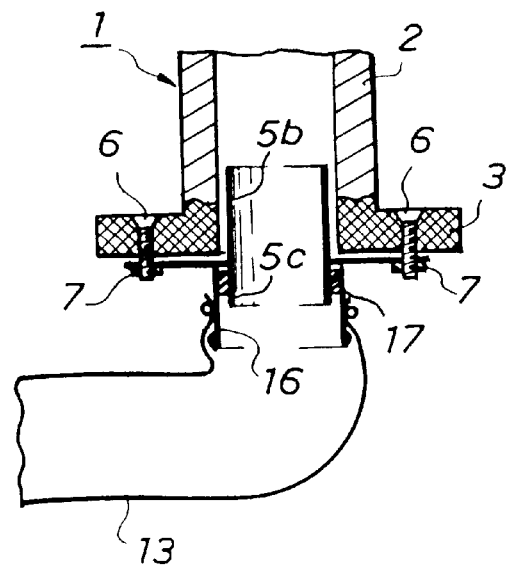
FIGS. 12–16 are partial cross-sectional views illustrating sealed states during a branch pipe lining operation using the branch pipe liner bags illustrated in FIGS. 3, 4, 5, 6 and 7.

In the branch pipe liner bag 1 illustrated in FIG. 3, as can be seen in FIG. 12, the front end nozzle 16 having the ring-shaped elastic member 17 secured around the inner periphery of the top end thereof is inserted into the protrusion 5c of the cylindrical member 5 from below and fitted on the outer periphery of the protrusion 5c, with the elastic member pressed onto the outer surface of the protrusion 5c. The front end nozzle 16 and the cylindrical member 5 are air-tight sealed by the elastic member 17. In addition, the elastic 17 also provides an air-tight connection between the pressure bag 13 and the branch pipe liner bag 1. It should be noted that in this case, the outer surface of the protrusion 5c of the cylindrical member 5, constitutes a sealing wall surface which receives an urging force of the elastic member 17 to seal the air pressure.

Figure 13:
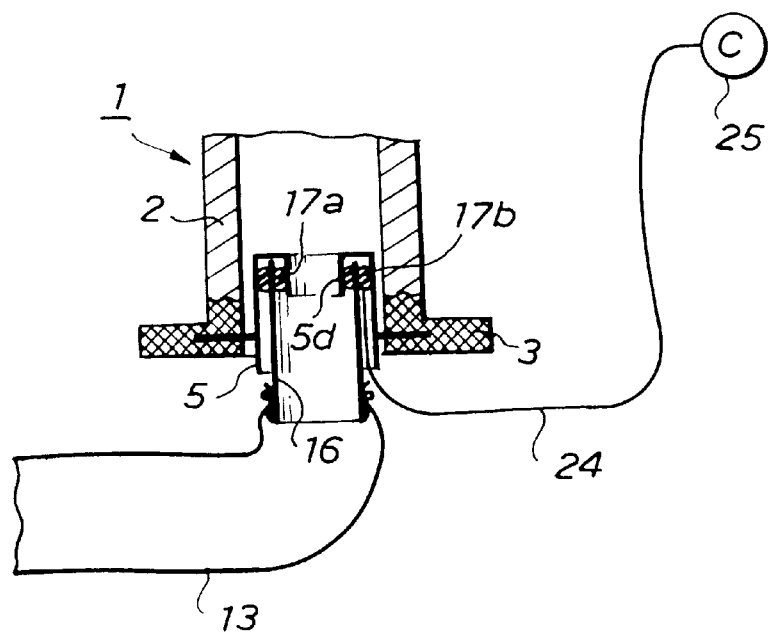

In the branch pipe liner bag 1 illustrated in FIG. 4, as can be seen in FIG. 13, the front end nozzle 16 having ring-shaped elastic members 17a, 17b secured around the inner periphery and the outer periphery of the top end thereof is inserted into a space defined by a bent portion 15d in an upper end section of the cylindrical member 5 from below. Here, the elastic member 17b is connected to a compressor 26 through an air hose 25 such that compressed air is supplied from the compressor 25 to the elastic member 17b through the air hose 24 to inflate the elastic member 17b. Thus, both the elastic members 17a, 17b are pressed onto the front end nozzle 16 and the cylindrical member S with a more strong force, so that the front end nozzle 16 and the cylindrical member S are more reliably sealed by the two elastic members 17a, 17b, thereby providing a secure air-tight connection between the pressure bag 13 and the branch pipe liner bag 1 by the action of the elastic members 17a, 17b.

Figure 14:
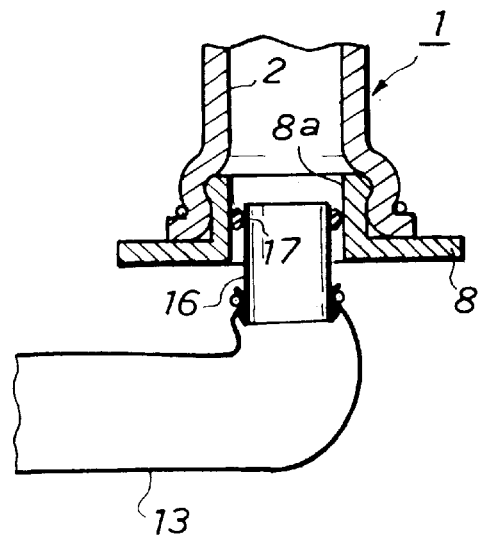

In the branch pipe liner bag 1 illustrated in FIG. 5, as can be seen in FIG. 14, the front end nozzle 16 having the ring-shaped elastic member 17 fitted on the outer periphery of a top end portion thereof is inserted into the protrusion 8a of the flange 8, serving also as an air pressure sealing member, from below, and the elastic member 17 is pressed onto the inner surface of the protrusion 8a, so that the front end nozzle 16 and the flange 8 are air-tight sealed by the elastic member 17. The elastic member 17 also provides an air-tight connection between the pressure bag 13 and the branch pipe liner bag 1. It should be noted that in this case, the inner surface of the protrusion 8a of the flange 8 constitutes a sealing wall surface which receives an urging force of the elastic member 17 to seal a fluid pressure.

Figure 15:
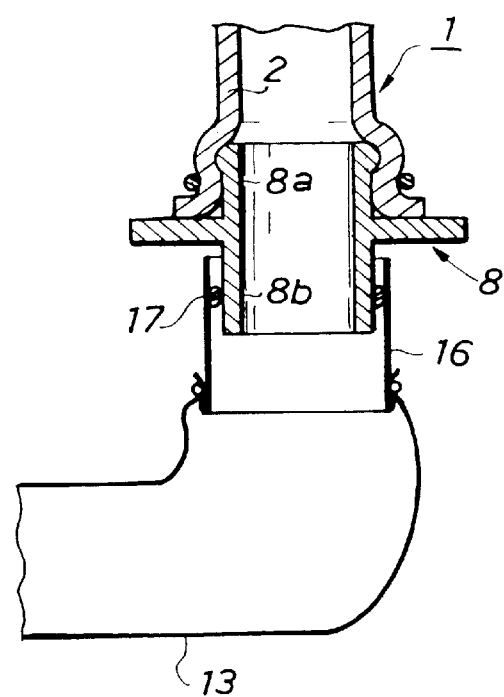

In the branch pipe liner bag 1 illustrated in FIG. 6, as can be seen in FIG. 15, the front end nozzle 16 having the ring-shaped elastic member 17 secured around the inner periphery of a top end portion thereof is fitted on the protrusion 8b of the flange 8, serving also as an air pressure sealing member, from below, and the elastic member 17 is pressed onto the outer surface of the protrusion 8b, so that the front end nozzle 16 and the flange 8 are air-tight sealed by the elastic member 17. The elastic member 17 also provides an air-tight connection between the pressure bag 13 and the branch pipe liner bag 1. It should be noted that in this case, the outer surface of the protrusion 8b of the flange 8 constitutes a sealing wall surface which receives an urging force of the elastic member 17 to seal pressure.

Figure 16:
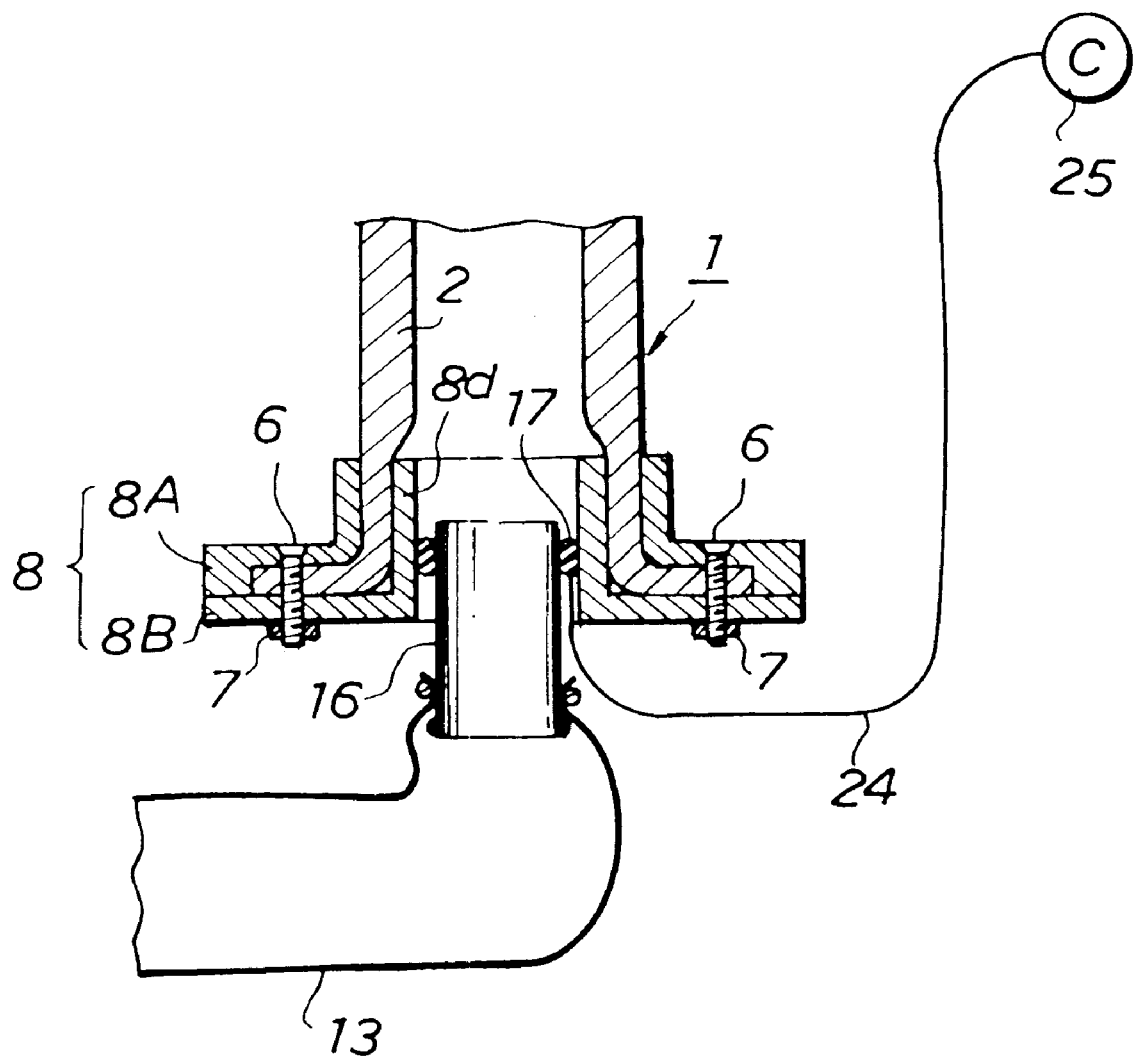
Figure 17:
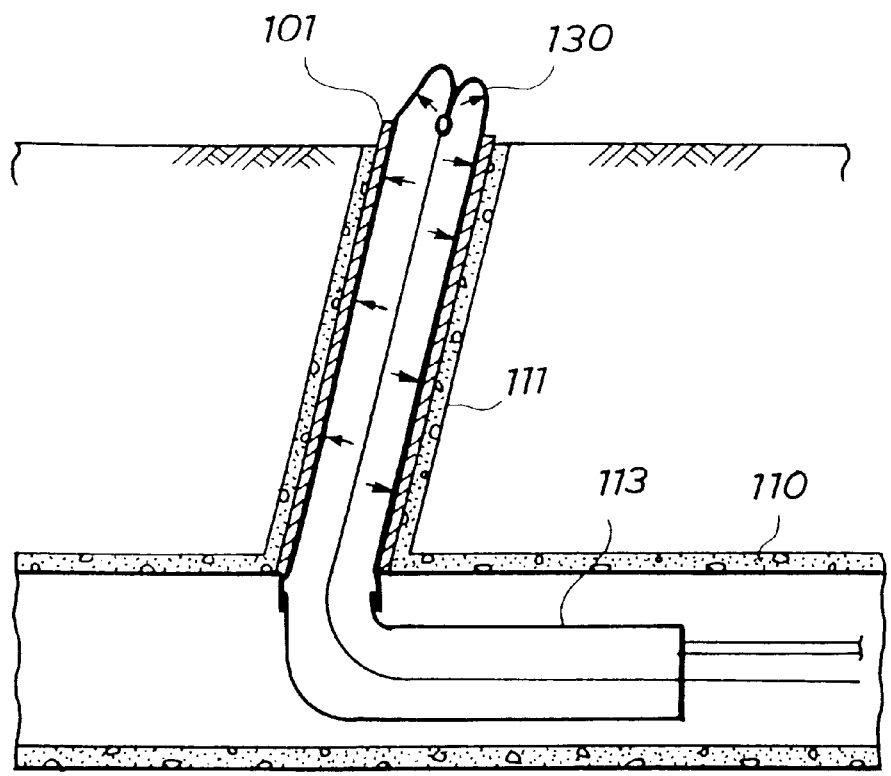
FIGS. 17–19 are cross-sectional views illustrating in order various steps of a conventional branch pipe lining method.
Figure 18:
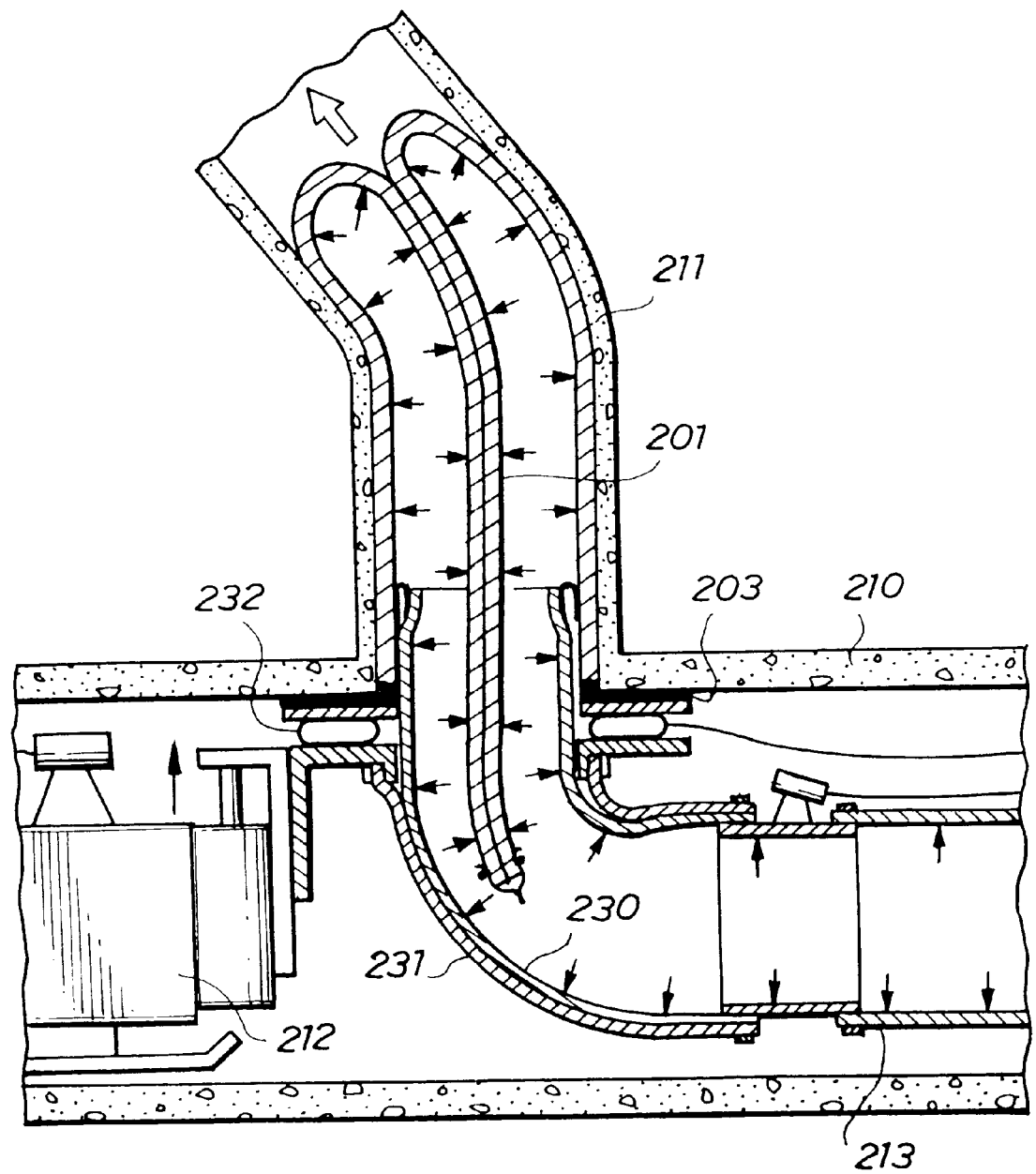
Figure 19:
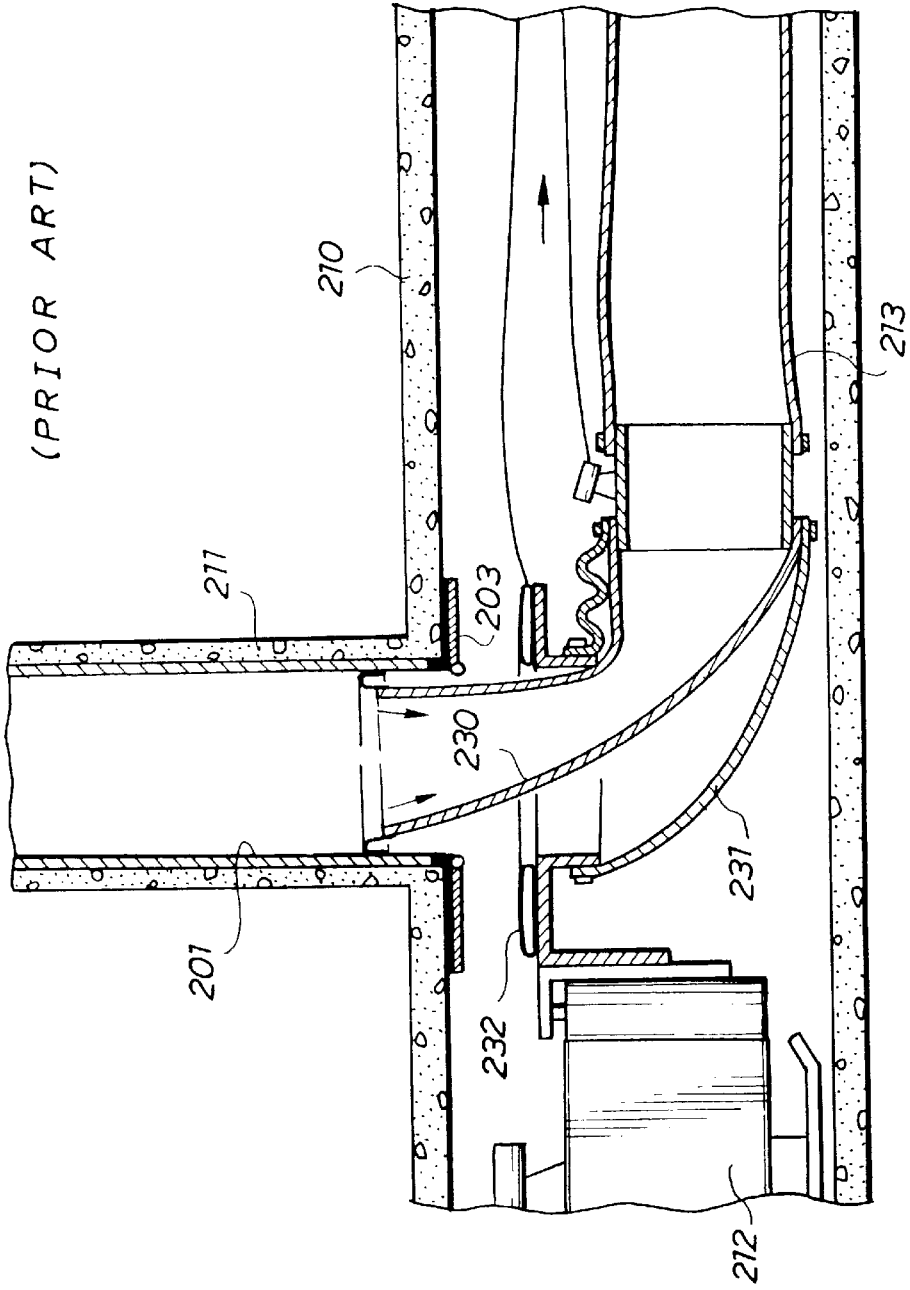

In the branch pipe liner bag 1 illustrated in FIG. 7, as can be seen in FIG. 16, the front end nozzle 16 having the ring-shaped elastic member 17 fitted on the outer periphery of a top end thereof is inserted into the separate piece 8B of the flange 8 from below. The elastic member 17 is connected to a compressor 25 through an air hose 24, such that compressed air is supplied from the compressor 25 to the elastic member 17 through the air hose 24 to inflate the elastic member 17. This causes the elastic member 17 to urge onto the inner surface of the separate piece 8B of the flange 8, thereby more reliably sealing the front end nozzle 16 and the flange 8 by the action of the elastic member 17. Thus, the elastic member 17 provides a secure air-tight connection between the pressure bag 13 and the branch pipe liner bag 1, so that the front end nozzle 16 and the flange 8 are air-tight sealed by the elastic member 17. The elastic member 17 also provides an air-tight connection between the pressure bag 13 and the branch pipe liner bag 1. It should be noted that in this case, the inner surface of the protrusion 8d of the separate piece 8B of the flange 8 constitutes a sealing wall surface which receives an urging force of the elastic member 17 to seal the air pressure.

In this invention, it should be noted that other fluids such as water can be used instead of air to evert and insert the branch pipe liner bag into the branch pipe.

As will be apparent from the foregoing description, according to the embodiments of the branch pipe liner bag and the branch pipe lining method using any of them, an air-tight connection or fluid-tight connection between the pressure bag and the branch pipe liner bag is made by the elastic member interposed between the front end nozzle and the cylindrical fluid pressure sealing member. After a branch pipe has been lined, the front nozzle is pulled out from the fluid pressure sealing member to separate the pressure bag from the branch pipe liner bag. As the result, any tear-off tube, which has been conventionally required, is no longer necessary for the branch pipe lining method. Consequently, the branch pipe liner bag is only left in the branch pipe to maintain a favorable surface state of the lined branch pipe.

While this invention has been described in connection with its preferred embodiments, it is to be understood that various modifications will occur to those skilled in the art without departing from the spirit of the invention. The scope of this invention is therefore to be determined solely by the appended claims.

What is claimed is:

1. A branch pipe liner bag comprising a tubular resin-absorbent material having a flange formed at one end thereof, an outer surface of said tubular resin-absorbent material being covered with a fluid-tight film, said tubular resin-absorbent material being impregnated with an unhardened hardenable resin, and a fluid pressure sealing member attached to a portion of said tubular resin-absorbent material, said fluid pressure sealing member including a sealing surface which is capable of receiving an urging force of an elastic member, and an elastic member being interposed between said fluid pressure sealing member and a fluid pressure supply device to seal therebetween when a branch pipe is lined.

2. A branch pipe liner bag as set forth in claim 1 wherein said flange is formed as a part of said tubular resin-absorbent material.

3. A branch pipe liner bag as set forth in claim 1 wherein said flange is formed separately from said tubular resin-absorbent material and as a part of said fluid pressure sealing member.

4. A branch pipe liner bag as set forth in claim 1 wherein said fluid pressure sealing member further has a flange portion sandwiched by said flange of the tubular resin-absorbent material.

5. A branch pipe liner bag as set forth in claim 1 wherein said fluid pressure sealing member further has a flange portion attached to said flange of the tubular resin-absorbent material with fastening means.

6. A branch pipe liner bag as set forth in claim 1 wherein said fluid pressure sealing member includes a protrusion which protrudes into said branch pipe after said branch pipe has been lined.

7. A branch pipe liner bag as set forth in claim 6 wherein said protrusion has a pocket and said sealing surface is formed therein.

8. A branch pipe liner bag as set forth in claim 6 wherein said fluid pressure sealing member further includes a second protrusion which protrudes into a main pipe after said branch pipe has been lined.

9. A branch pipe liner bag as set forth in claim 8 wherein the second protrusion has said sealing surface.

10. A branch pipe liner bag as set forth in claim 1 wherein said fluid pressure sealing member is made of metal.

11. A branch pipe liner bag as set forth in claim 1 wherein said fluid pressure sealing member is made of hard plastic.

12. A branch pipe liner bag as set forth in claim 1 wherein said fluid pressure sealing member has a cylindrical portion.

13. A branch pipe liner bag as set forth in claim 12 wherein said fluid pressure supply device has a nozzle which is cylindrically shaped, and said elastic member is interposed between said cylindrical portion of said fluid pressure sealing member and said nozzle of said fluid pressure supply device.

14. A branch pipe liner bag as set forth in claim 12 wherein said tubular resin-absorbent material and said fluid pressure sealing member are coupled together with each other, and circumferentially sealing therebetween at their coupling portions.

15. A branch pipe liner bag as set forth in claim 14 wherein said flange is formed as a part of said fluid pressure sealing member, and said fluid pressure sealing member additionally has a flange portion that is buried, at least in part, in said flange.

16. A branch pipe liner bag as set forth in claim 14 wherein an end of said tubular resin-absorbent material wraps the fluid pressure sealing member, at least in part, and a band binds said tubular resin-absorbent material and said fluid pressure sealing member together.

17. A branch pipe lining method for lining a branch pipe using a branch pipe liner bag comprised of a tubular resin-absorbent material having a flange formed at one end thereof, an outer surface of said tubular resin-absorbent material being covered with a fluid-tight film, said tubular resin-absorbent material being impregnated with an unhardened hardenable resin, and a fluid pressure sealing member attached to a portion of said tubular resin-absorbent material, said fluid pressure sealing member including a sealing surface which is capable of receiving an urging force of an elastic member to seal a fluid pressure, said method comprising inserting a fluid pressure supply device into said fluid pressure sealing member of said branch pipe liner bag, said fluid pressure supply device accommodating said tubular resin absorbent material of said branch pipe liner bag except for said flange, sealing said fluid pressure supply device and said fluid pressure sealing member by said elastic member interposed therebetween, bringing said flange of the branch pipe liner bag into close contact with an opening of a branch pipe, supplying a pressurized fluid into said branch pipe liner bag by said fluid pressure supply device to evert and insert said branch pipe liner bag into the branch pipe from a main pipe toward the ground, hardening the hardenable resin impregnated in said branch pipe liner bag with the inserted branch pipe liner bag being pressed onto an inner wall of the branch pipe, and detaching said fluid pressure supply device from said fluid pressure scaling member.

18. A branch pipe lining method as set forth in claim 17 wherein said fluid pressure supply device includes a nozzle said sealing step includes the steps of mounting said elastic member to the outer periphery of said nozzle, inserting said nozzle into said fluid pressure sealing member, and pressing said elastic member onto said fluid pressure sealing member.

19. A branch pipe lining method as set forth in claim 17 wherein said fluid pressure supply device includes a nozzle, said sealing step includes the steps of mounting said elastic member to the outer periphery of said nozzle, fitting said nozzle on the outer periphery of a protrusion of said fluid pressure sealing member, said protrusion protruding toward the main pipe, and pressing said elastic member onto said protrusion of said fluid pressure sealing member.

20. A branch pipe lining method as set forth in claim 17 wherein said steps of inserting, sealing and bringing are made by a robot.

21. A branch pipe lining method as set forth in claim 17 further comprising the step of inflating said elastic member by the action of a fluid pressure.

22. A branch pipe lining method for lining a branch pipe using a branch pipe liner bag including a flange formed at one end thereof and extending outwardly, and a cylindrical member attached inside of a portion of said liner bag that abuts said flange, said method comprising inserting a cylindrical nozzle of a pressure fluid supply device into said cylindrical member, sealing said cylindrical nozzle and said cylindrical member by an elastic member interposed therebetween, bringing said flange of the branch pipe liner bag into close contact with an opening of a branch pipe, and supplying a pressurized fluid into said branch pipe liner bag by said fluid pressure supply device to insert said branch pipe liner bag into the branch pipe from a main pipe.

* * * * *

UNITED STATES PATENT AND TRADEMARK OFFICE
CERTIFICATE OF CORRECTION

PATENT NO.   : 6,152,184
DATED        : November 28, 2000
INVENTOR(S)  : Takao Kamiyama et al.

It is certified that error appears in the above-identified patent and that said Letters Patent is hereby corrected as shown below:

Column 10,
Line 63, please change "scaling member" to -- sealing member --

Signed and Sealed this

Twenty-first Day of May, 2002

Attest:

Attesting Officer

JAMES E. ROGAN
Director of the United States Patent and Trademark Office